(12) United States Patent
Lee et al.

(10) Patent No.: US 8,817,047 B1
(45) Date of Patent: Aug. 26, 2014

(54) PORTABLE DEVICE AND METHOD OF CONTROLLING THEREFOR

(71) Applicant: LG Electronics Inc., Seoul (KR)

(72) Inventors: Doyoung Lee, Seoul (KR); Yongsin Kim, Seoul (KR); Hyorim Park, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/142,445

(22) Filed: Dec. 27, 2013

(30) Foreign Application Priority Data

Sep. 2, 2013 (KR) ........................ 10-2013-0105125

(51) Int. Cl.
*G09G 5/00* (2006.01)

(52) U.S. Cl.
USPC ........................................... 345/633; 345/632

(58) Field of Classification Search
CPC combination set(s) only.
See application file for complete search history.

(56) References Cited

U.S. PATENT DOCUMENTS

| | | |
|---|---|---|
| 2009/0322671 A1 | 12/2009 | Scott et al. |
| 2011/0221669 A1 | 9/2011 | Shams et al. |
| 2012/0019557 A1 | 1/2012 | Aronsson et al. |
| 2012/0057794 A1* | 3/2012 | Tsurumi et al. ............... 382/195 |
| 2012/0143361 A1 | 6/2012 | Kurabayashi et al. |
| 2013/0155307 A1 | 6/2013 | Bilbrey et al. |

FOREIGN PATENT DOCUMENTS

WO WO 2010/094065 A1 8/2010

OTHER PUBLICATIONS

Gammeter, Stephan, et al. "Server-side object recognition and client-side object tracking for mobile augmented reality." Computer Vision and Pattern Recognition Workshops (CVPRW), 2010 IEEE Computer Society Conference on. IEEE, 2010.*
Goldman, Dan B., et al. "Video object annotation, navigation, and composition." Proceedings of the 21st annual ACM symposium on User interface software and technology. ACM, 2008.*
Livingston, Mark A., et al. "Military applications of augmented reality." Handbook of Augmented Reality. Springer New York, 2011. 671-706.*
Ulbricht, Christiane, and Dieter Schmalstieg. "Tangible augmented reality for computer games." Proceedings of the Third IASTED International Conference on Visualization, Imaging and Image Processing. 2003.*
Henrysson, Anders. "Bringing augmented reality to mobile phones." (2007).*

* cited by examiner

*Primary Examiner* — Ulka Chauhan
*Assistant Examiner* — Schiller Hill
(74) *Attorney, Agent, or Firm* — Birch, Stewart, Kolasch & Birch, LLP

(57) ABSTRACT

A portable device is disclosed. The portable device according to one embodiment includes a camera unit configured to capture an image in front of the portable device, a display unit configured to display a virtual image, and a processor configured to control the camera unit and the display unit, the processor further configured to detect a marker object from the image, display the virtual image corresponding to the marker object based on a position of the marker object when the marker object is detected, detect a position change of the marker object in the image, move the virtual image according to the position change when the position change is detected and obtain a first moving speed of the virtual image or a second moving speed of the marker object, when the first moving speed or the second moving speed is faster than a first reference speed, lower the first moving speed to less than the first reference speed.

20 Claims, 16 Drawing Sheets

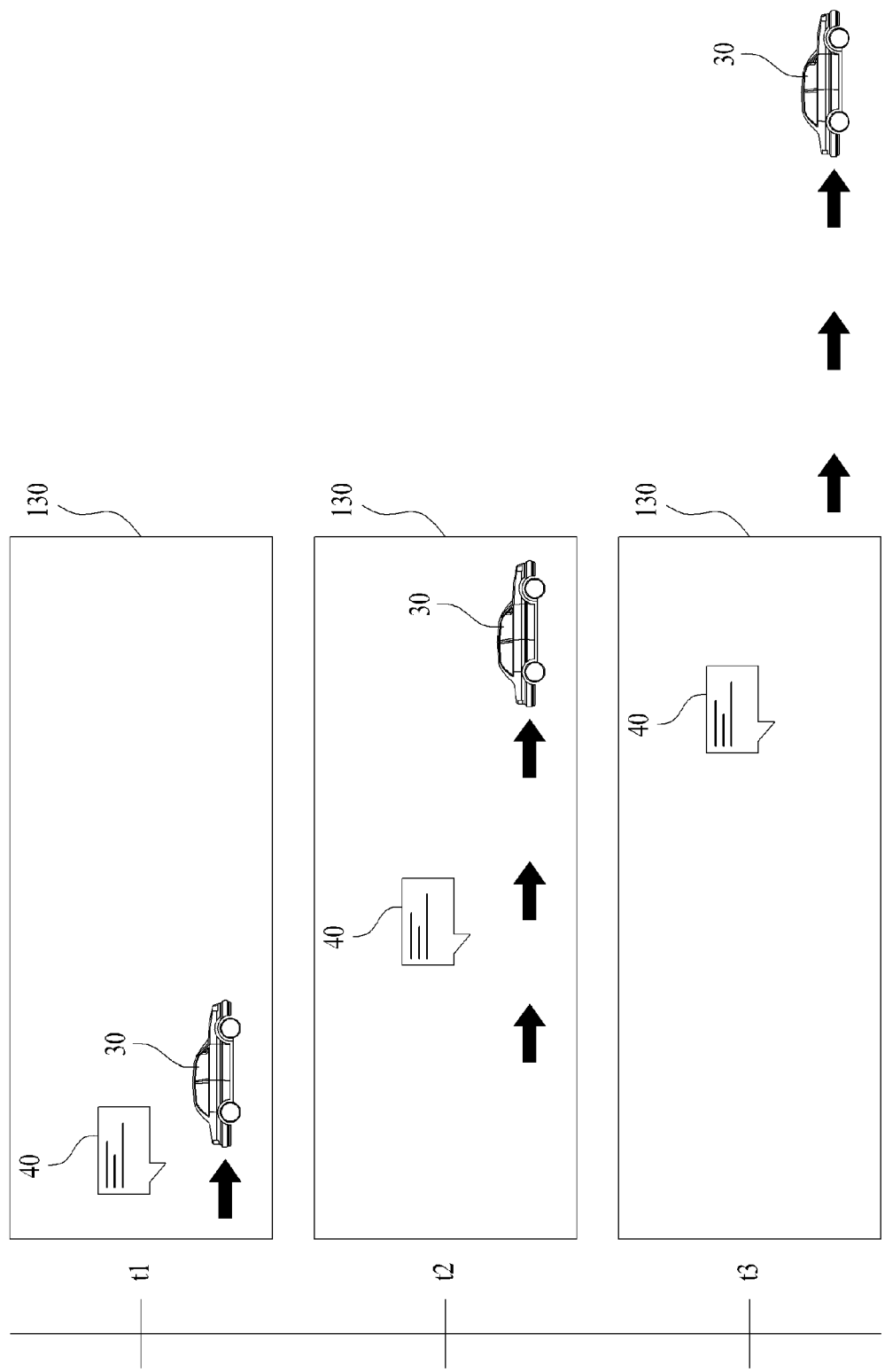

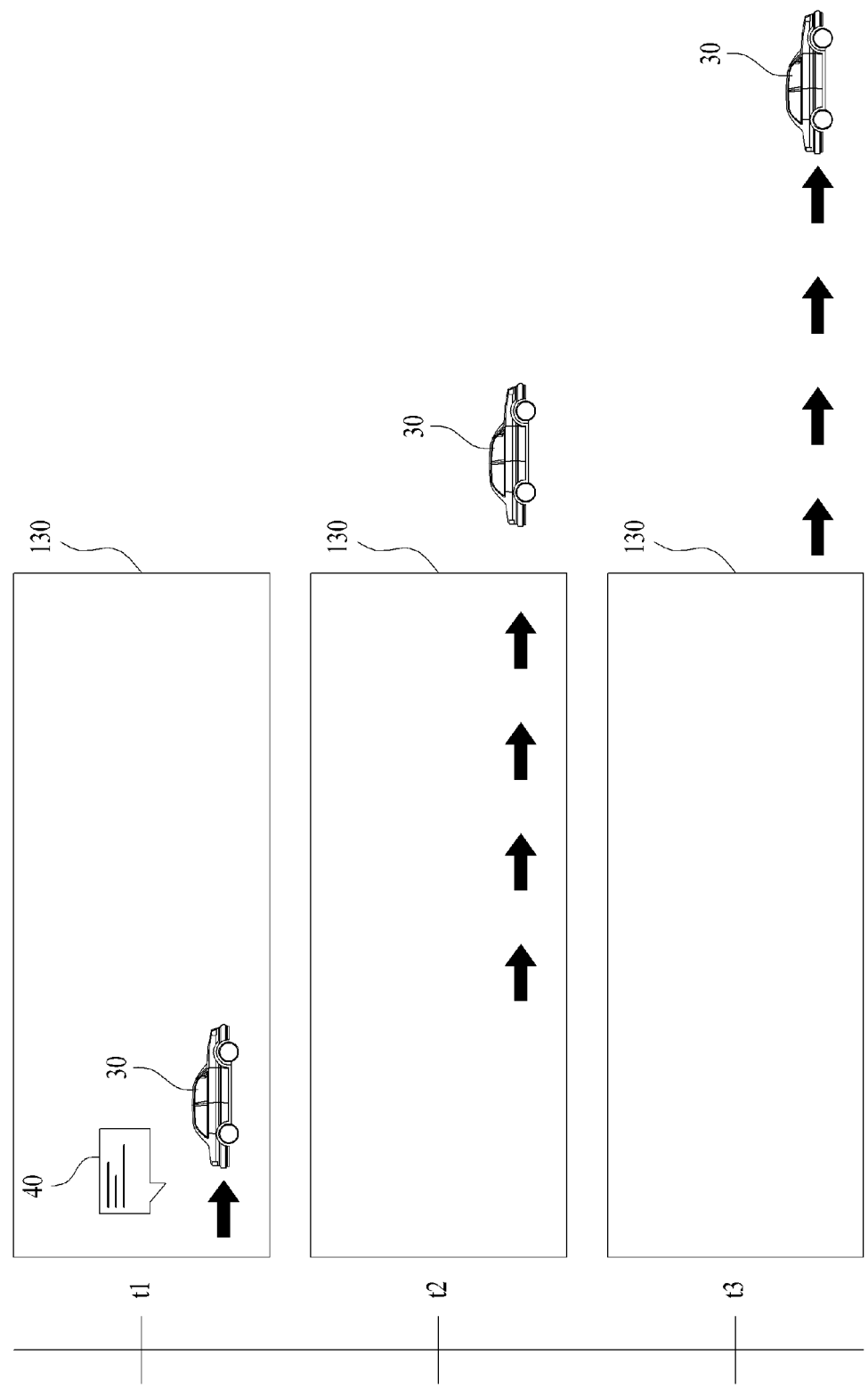

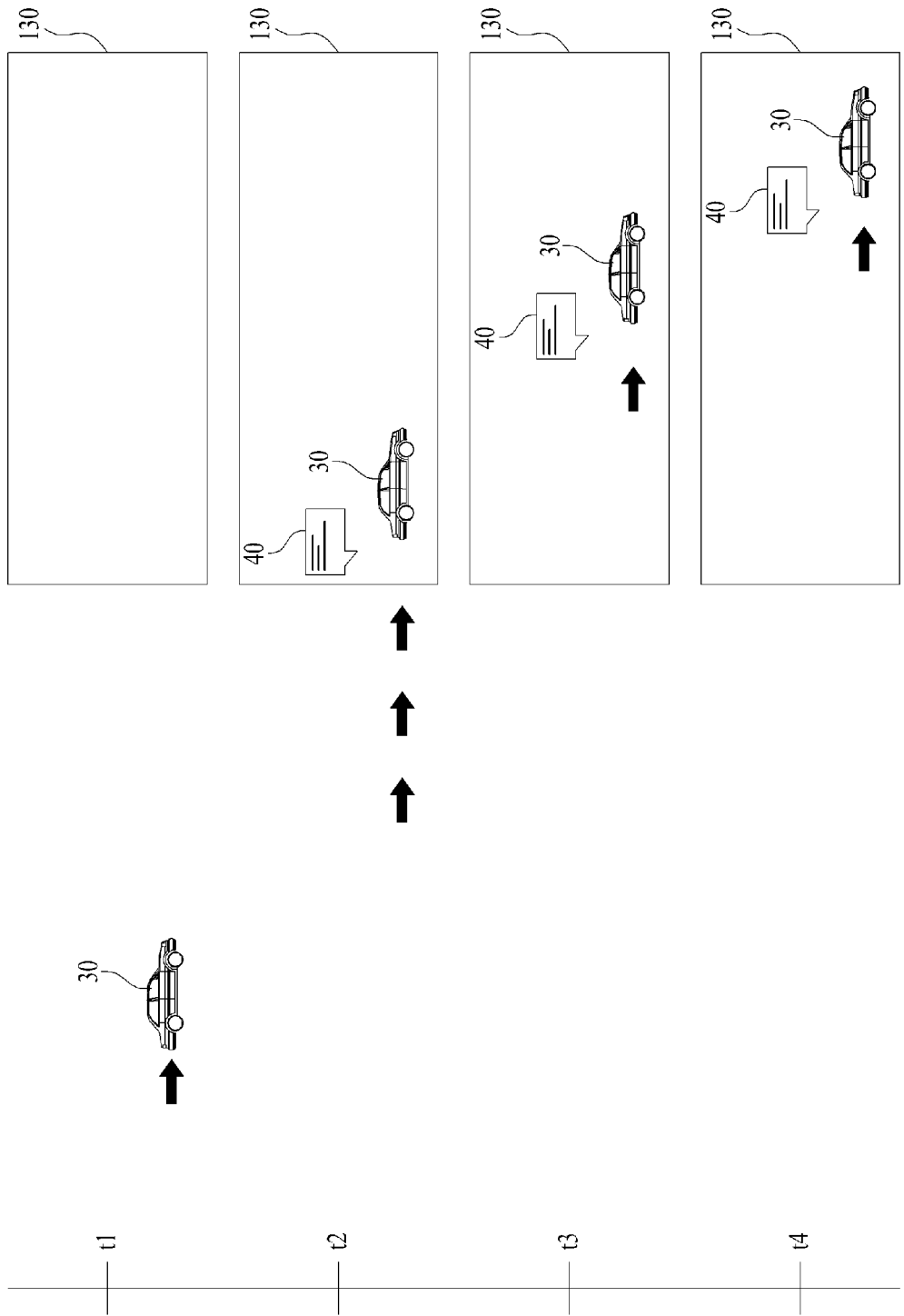

PORTABLE DEVICE AND METHOD OF CONTROLLING THEREFOR

Pursuant to 35 U.S.C. §119(a), this application claims the benefit of the Korean Patent Application No. 10-2013-0105125, filed on Sep. 2, 2013, which is hereby incorporated by reference as if fully set forth herein.

BACKGROUND OF THE INVENTION

1. Field of the Invention

The present specification relates to a portable device, and more particularly, to a portable device providing an augmented reality (AR) service by displaying a virtual image for a real object and a method of controlling therefor.

2. Discussion of the Related Art

As a technology has been developed, a portable device changes itself as a smart device capable of providing various services to a user. Recently, the portable device is utilized as a device providing an augmented reality (AR) service, which corresponds to a service showing a real image and a virtual image together in a manner of mixing both images.

The portable device provides the AR service using a method that a virtual image corresponding to a real object, which is detected from a nearby image, is displayed in a manner of being overlapped to the real object.

In case of providing the AR service with the aforementioned display method, if the real object moves fast, the virtual image moves fast as well. Hence, it is difficult for a user to observe the virtual image or to obtain information included in the virtual image.

SUMMARY OF THE INVENTION

Accordingly, the present specification is directed to an apparatus and method thereof that substantially obviate one or more problems due to limitations and disadvantages of the related art.

In providing an AR service, an object of the present specification is to provide a portable device changing a method of displaying a virtual image according to whether the virtual image moves and a moving speed of the virtual image and a method of controlling therefor.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a portable device according to one embodiment includes a camera unit configured to capture an image in front of the portable device, a display unit configured to display a virtual image, and a processor configured to control the camera unit and the display unit, the processor further configured to detect a marker object from the image, display the virtual image corresponding to the marker object based on a position of the marker object when the marker object is detected, detect a position change of the marker object, move the virtual image according to the position change when the position change is detected, and obtain a first moving speed of the virtual image or a second moving speed of the marker object, when the first moving speed or the second moving speed is faster than a first reference speed, lower the first moving speed to less than the first reference speed.

To achieve these objects and other advantages and in accordance with the purpose of the invention, as embodied and broadly described herein, a method of controlling a portable device includes the steps of capturing an image in front of the portable device, detecting a marker object from the image, when the marker object is detected, obtaining an information on the virtual image corresponding to the marker object and displaying the virtual image based on a position of the marker object, detecting a position change of the marker object, when the position change is detected, moving the virtual image according to the position change and obtaining a moving speed of the virtual image or a moving speed of the marker object, and when the moving speed of the virtual image or the moving speed of the marker object is faster than a first reference speed, lowering the moving speed of the virtual image less than the first reference speed.

According to the present specification, a portable device according to one embodiment can provide a user-friendly AR service. More specifically, in providing an AR service, the portable device can provide a virtual image readable by a user irrespective of a moving speed of a marker object in a manner of controlling a moving speed of the virtual image moving in accordance with a position change of the marker object. And, in case of controlling the moving speed of the virtual image, the portable device can further enhance readability of the virtual image in a manner of changing a method of displaying the virtual image. And, the portable device can determine whether the virtual image is continuously displayed according to the moving speed of the detected virtual image or a size of the marker object and then can stop displaying an unnecessary virtual image, thereby reducing power consumption of the portable device.

It is to be understood that both the foregoing general description and the following detailed description of the present specification are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIGS. 5A-5D are diagrams of a portable device displaying a virtual image in accordance with a moving speed of the virtual image according to one embodiment;

DETAILED DESCRIPTION OF THE INVENTION

Although terminologies used in the present specification are selected from general terminologies used currently and widely in consideration of functions, they may be changed in accordance with intentions of technicians engaged in the corresponding fields, customs, advents of new technologies and the like. Occasionally, some terminologies may be arbitrarily selected by the applicant(s). In this case, the meanings of the arbitrarily selected terminologies shall be described in the corresponding part of the detailed description of the specification. Therefore, terminologies used in the present specification need to be construed based on the substantial meanings of the corresponding terminologies and the overall matters disclosed in the present specification rather than construed as simple names of the terminologies.

Moreover, while the embodiments have been concretely described with reference to the attached diagrams and the contents written on the diagrams, a scope of claims may be non-restricted or non-limited to the embodiments.

The present specification relates to a portable device. In the present specification, the portable device corresponds to a portable electronic device and may mean an electronic device capable of capturing an image in front of the device, detecting a marker object from the captured image, and displaying a virtual image related to the detected marker object. For instance, the portable device may correspond to such various electronic devices as a smartphone, a smart pad, a personal digital assistant (PDA), a tablet PC, a smart table, a head mounted display (HMD), or the like.

In the present specification, a marker object may mean an object including a marker to indicate whether a related virtual image exists or whether a virtual image is displayed. In this case, the marker may correspond to a promised pattern or a form of a code equipped on a surface of a random object. Or, the marker may correspond to a random object itself. These kinds of all optical identifiers can be called a marker. And, in the present specification, a virtual image corresponds to an image consisted of a text and a graphic and indicates an image configured to provide an augmented reality information related to a marker object to a user. For instance, if the marker object corresponds to a bus, the virtual image may correspond to an image configured to provide such augmented reality information as information on a bus line, an allocation interval, or a position of the next bus.

Figure 1:
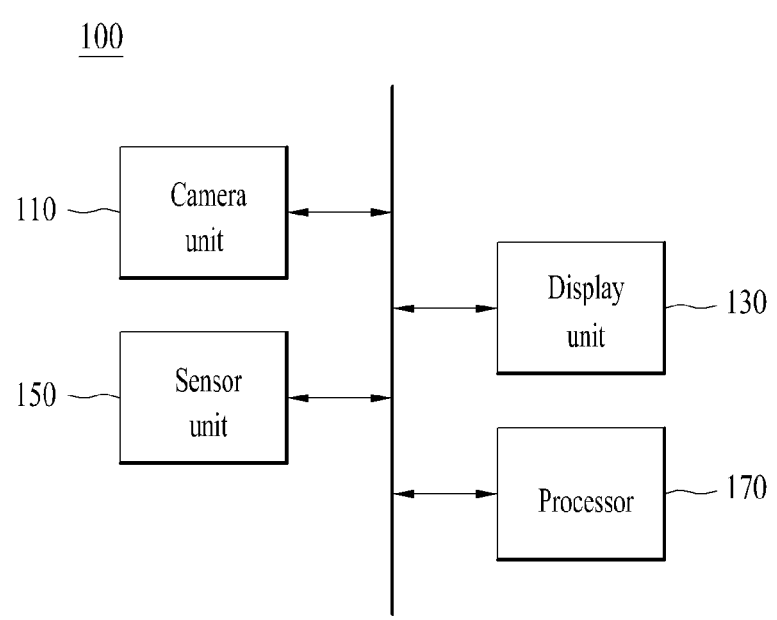
FIG. 1 is a block diagram of a portable device according to one embodiment.

FIG. 1 is a block diagram of a portable device according to one embodiment.

Referring to FIG. 1, the portable device 100 includes a camera unit 110, a display unit 130, a sensor unit 150, and a processor 170.

The camera unit 110 can capture an image in front of a device. More specifically, the camera unit 110 captures an image in front of a device within an angle of view and can deliver the captured image to the processor 170. In this case, the angle of view indicates an angle capable of taking an image via a lens of a camera. In this case, the captured image may correspond to a form of a picture, a video, a still frame. And, the captured image can include at least one marker object.

The display unit 130 can display a virtual image. More specifically, the display unit 130 can display a virtual image based on a control command of the processor 170.

The display unit 130 can be equipped with a non-transparent or a transparent display panel. In this case, the transparent display panel may include a translucent display panel. For instance, the non-transparent display panel may correspond to a liquid crystal display (LCD), a plasma display panel (PDP), a light-emitting diode display (LED), an organic light-emitting diode display (PLED), or the like. For instance, the transparent display panel may correspond to an optical see-through display panel.

The sensor unit 150 senses a user input or environment of a device using at least one sensing means installed in the device and can deliver a sensed result to the processor. The at least one sensing means may include such a sensing means as gravity sensor, a terrestrial magnetism sensor, a motion sensor, a gyroscope sensor, an acceleration sensor, an infrared sensor, a tilt (inclination) sensor, a brightness sensor, an altitude sensor, a smell sensor, a temperature sensor, a depth sensor, a pressure sensor, a bending sensor, an audio sensor, a video sensor, a GPS (global positioning system) sensor, a touch sensor, and the like. The aforementioned sensors may be included in the device as a separate element or may be included in the device in a manner of being combined to at least one element.

A storage unit can store such a various digital data as a video, an audio, a picture, an application, and the like. The storage unit can be installed in the inside or the outside of the portable device 100. For instance, an internal storage unit can be installed in the inside of the portable device using a storing means such as a flash memory, a hard disk drive (HDD), a solid state drive (SSD). As a different example, an external storage unit can be installed in the outside of the portable device 100 using a server on the internet represented as a cloud. The external storage unit using the cloud can provide a data existing in a position physically different from each other in a manner of integrating the data with a virtualizing technique.

The communication unit can transceive a data with an external in a manner of performing a communication using various protocols. The communication unit accesses an external network by wired or wireless and can transceive a digital/analog data with the network.

The processor 170 executes various applications and can process a data of the internal of the device. And, the processor 170 controls each of the units of the aforementioned portable device 100 and can control data transmission/reception between units.

The processor of the present specification detects a marker object from a captured image and can display a virtual image corresponding to the detected marker object based on a position of the marker object. And, the processor detects a position change of the marker object, moves the virtual image according to the position change, and can obtain a first moving speed of the virtual image. And, when the first moving speed is faster than a first reference speed, the processor can slow down the first moving speed to make the first moving speed less than a first reference speed. Detailed explanation on the processor shall be described in the following description with reference to each drawing.

First of all, FIG. 1 is a block diagram of a portable device 100 according to one embodiment. Blocks represented in a manner of being separated indicate the logically distinguished elements of the device. Hence, the elements of the aforementioned device can be equipped with a single chip or a plurality of chips according to the design of the device. And, the portable device 100 depicted in FIG. 1 is just one embodiment. All elements included in FIG. 1 are not necessary to perform embodiments of the present specification. In the following description, elements required for the embodiment of the present specification and operations of the elements are explained in detail.

FIG. 2 is a diagram of a portable device capturing an image in front of the portable device and displaying a virtual image according to one embodiment.

Figure 2A:
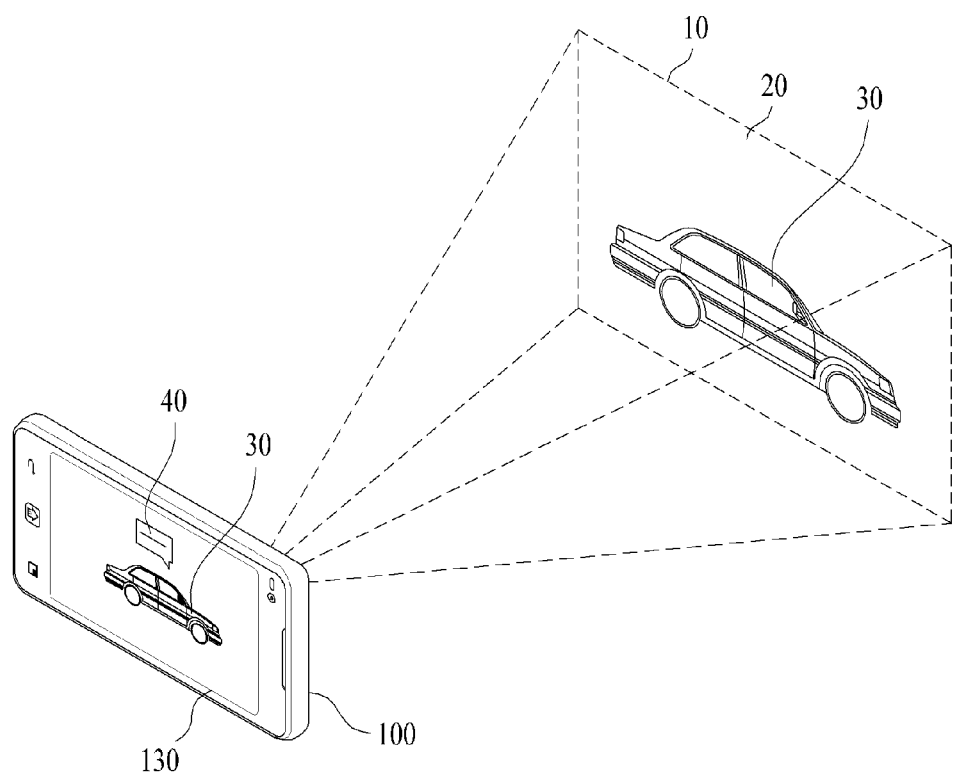
FIGS. 2A-2B are diagrams of a portable device capturing an image in front of a device and displaying a virtual image according to one embodiment.
Figure 2B:
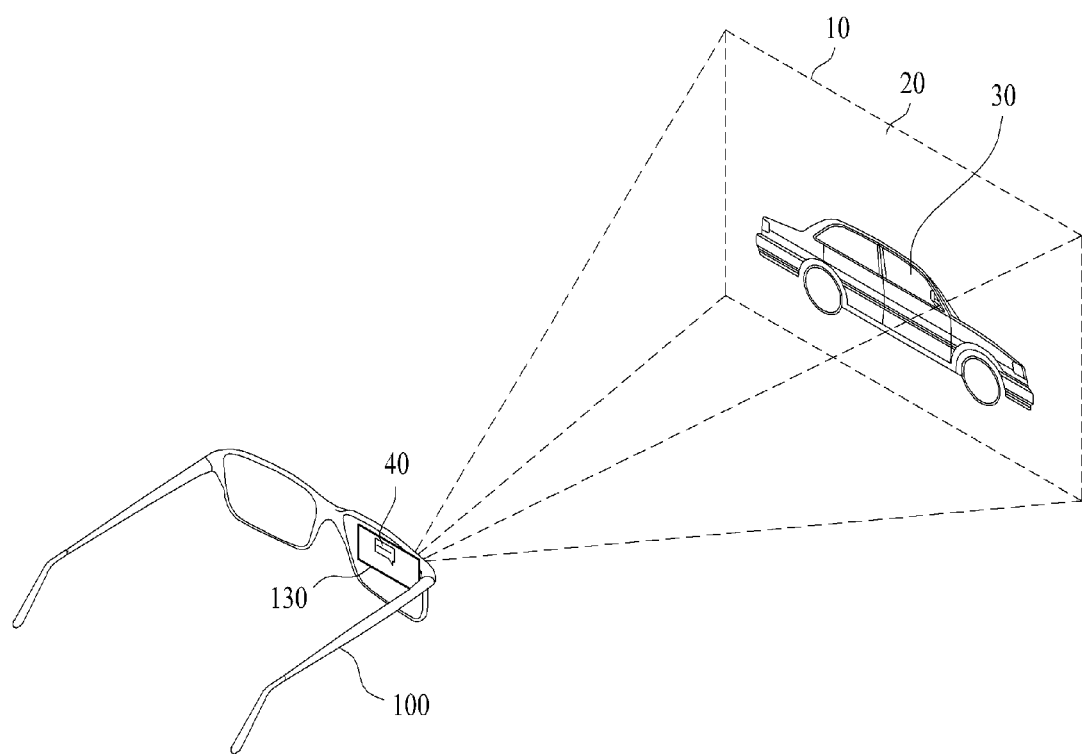

FIG. 2a is an embodiment of the portable device including a display unit equipped with a non-transparent display panel and FIG. 2b is an embodiment of the portable device including a display unit equipped with a transparent display panel.

Referring to FIG. 2a and FIG. 2b, the portable device 100 can capture an image 20 in front of the device within an angle of view 10 area using a camera unit. In this case, the camera unit can capture the image 20 in front of the device contiguously or with a specific time interval. For instance, the camera unit contiguously captures the image 20 in front of the device and can deliver the captured image 20 of a video form to the processor. As a different example, the camera unit captures the image 20 in front of the device with a specific time interval and can deliver the captured image 20 of a still frame form to the processor.

And, the portable device 100 can detect a marker object 30 using the processor. For instance, the processor detects the marker object 30 from the captured image 20 captured by the camera unit or can detect the marker objects 30 from a data corresponding to the image 20 displayed in the display unit. In this case, the processor can detect the marker object 30 in a manner of applying a pre-stored detecting algorithm.

And, the portable device 100 can obtain information (hereinafter also called virtual image information) on a virtual image 40 related to the marker object 30 using the processor. For instance, the processor directly obtains the virtual image information from an internal storage unit or can obtain the virtual image information from an external storage unit via the communication unit. In this case, the external storage unit can provide the virtual image information existing in a position physically different from each other to the portable device via a wired/wireless communication network in a manner of integrating the virtual image information with a virtualization technique.

In this case, the virtual image information can include at least one of augmented reality information related to the marker object, information on a display mode (display mode information), information on a graphic user interface format (graphic user interface format information).

In this case, the display mode is a mode to determine a quantity of the augmented reality information included in a display object. The display mode can be classified into a general display mode and a simple display mode. The general display mode is the display mode configured to include all augmented reality information included in the virtual image information in the display object. The simple display mode is the display mode configured to include selected augmented reality information in the display object only among the augmented reality information included in the virtual image information.

In this case, the graphic user interface format means a user interface format to display a virtual image in the display unit. The graphic user interface format according to one embodiment can include at least one of a display position, a display size, a display shape, a display color of the virtual image, or a display transparency of the virtual image.

And, the portable device 100 can display the virtual image 40 based on a position of the marker object 30 using the processor. For instance, as depicted in FIG. 2a, the processor can display the virtual image 40 in the top of the marker object 30 corresponding to the virtual image. As a different example, the processor can display the virtual image 40 in such various positions as the bottom, the left, the right, or the like of the marker object 30 corresponding to the virtual image 40. As a further different example, the processor can display the virtual image 40 in a manner of overlapping the marker object 30 corresponding to the virtual image with the virtual image 40.

As depicted in FIG. 2a, in case of a display unit 130 equipped with a non-transparent panel, the portable device 100 can display a captured image 20 and the virtual image 40 together. As depicted in FIG. 2b, in case of the display unit equipped with a transparent display panel, the portable device 100 can display the virtual image 40 in a manner that the virtual image 40 overlaps a real environment of which a user sees without displaying the captured image 20.

FIG. 3 is a diagram of a portable device displaying a virtual image for a plurality of detected marker images according to one embodiment.

Figure 3A:
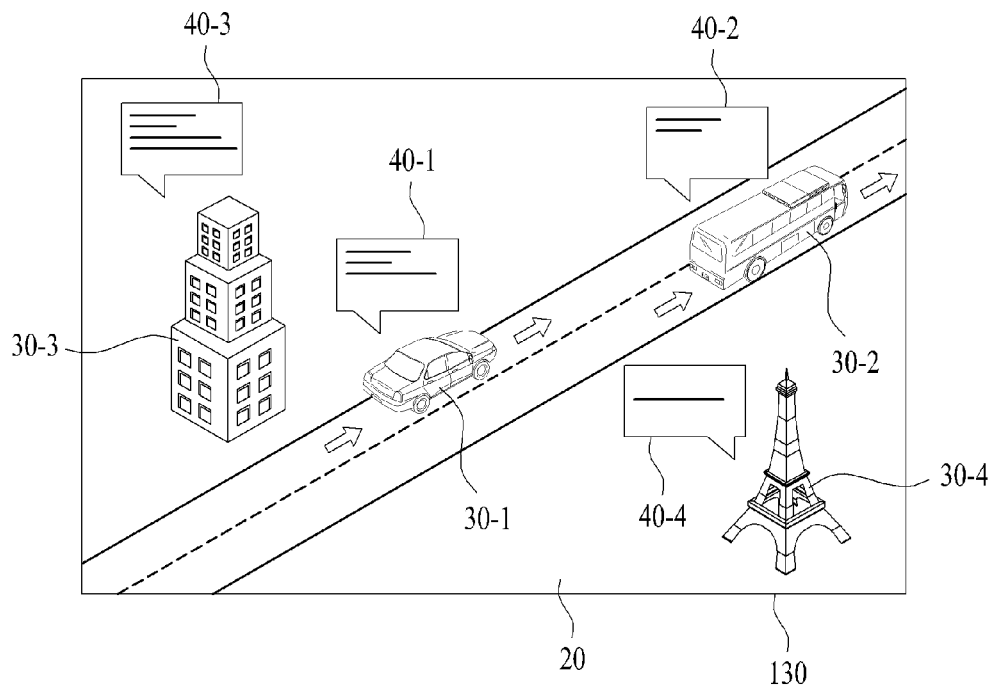
FIGS. 3A-3C are diagrams of a portable device displaying a virtual image for a plurality of detected marker images according to one embodiment.
Figure 3B:
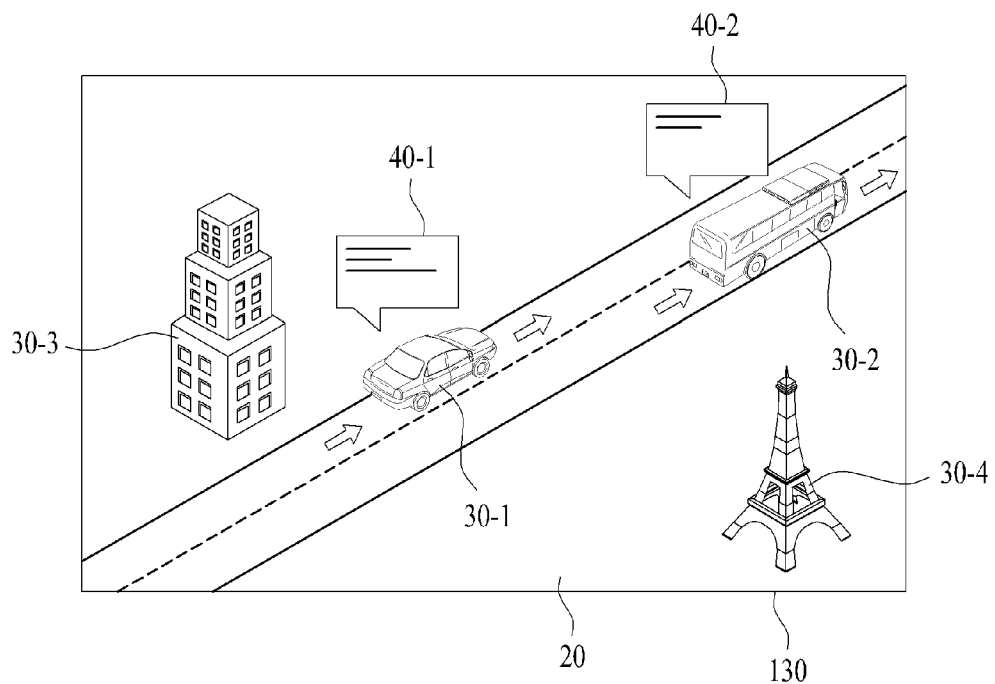
Figure 3C:
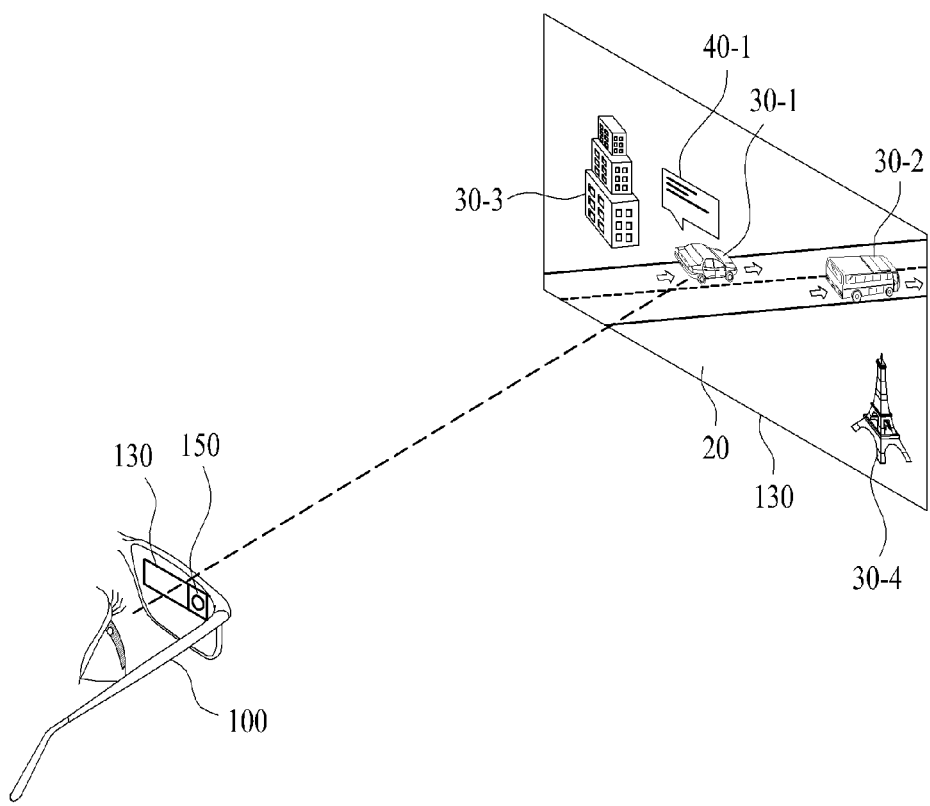

More specifically, FIG. 3a is an embodiment of the portable device displaying a virtual image for all of a plurality of detected marker objects, FIG. 3b is an embodiment of the portable device displaying a virtual image for a selected marker object among a plurality of the detected marker objects, and FIG. 3c is an embodiment of the portable device displaying a virtual image for a marker object positioned at a user gaze among a plurality of the detected marker objects.

In FIG. 3a to FIG. 3c, since detail contents of obtaining the virtual image information and displaying the virtual image based on a position of a marker object are identical to the contents mentioned earlier in FIG. 2, detail contents are omitted.

First of all, referring to FIG. 3a, when a plurality of marker objects (30-1, 30-2, 30-3, and 30-4) are detected, the portable device can obtain virtual image information related to each of a plurality of the marker objects (30-1, 30-2, 30-3, and 30-4). The portable device can display each of virtual images (40-1, 40-2, 40-3, and 40-4) based on positions of the corresponding marker objects (30-1, 30-2, 30-3, and 30-4) using the obtained virtual image information.

Referring to FIG. 3b, when a plurality of the marker objects (30-1, 30-2, 30-3, and 30-4) are detected, the portable device selects specific marker objects (30-1 and 30-2) among a plurality of the marker objects (30-1, 30-2, 30-3, and 30-4) according to a predetermined selection condition and can obtain virtual image information related to the selected specific marker objects (30-1 and 30-2). In this case, the selection condition is a condition to select the specific marker object displaying a related virtual image. The selection condition may include information on an attribute and a type of a marker object. The selection condition may be a condition configured based on a user input. And, the selection condition may correspond to a condition stored in advance in the portable device.

For instance, as depicted in FIG. 3b, if mobility of a marker object is configured as the selection condition, the portable device selects specific marker objects (30-1 and 30-2) having mobility among a plurality of the marker objects (30-1, 30-2, 30-3, and 30-4) and can obtain virtual image information related to the selected specific marker objects (30-1 and 30-2). And, the portable device can display each of the virtual images (40-1 and 40-2) based on the positions of the corresponding specific marker objects (30-1 and 30-2) using the obtained virtual image information.

Referring to FIG. 3*c*, in case that a plurality of the marker objects (30-1, 30-2, 30-3, and 30-4) are detected, the portable device senses a user gaze using the sensor unit 150 and can detect a gaze location where the user's gaze is on, and can select at least one marker object from the plurality of marker objects (30-1, 30-2, 30-3, and 30-4) based on the gaze location.

For instance, as depicted in FIG. 3*c*, the portable device can select one marker object (30-1) positioned at the sensed gaze location or positioned at an area adjacent to the sensed gaze location from a plurality of the detected marker objects (30-1, 30-2, 30-3, and 30-4). And, the portable device obtains virtual image information on the selected marker objects (30-1) and can display a virtual image (40-1) based on a position of the selected marker object (30-1) using the obtained virtual image information.

As a different example, the portable device can select a plurality of marker objects (30-1 and 30-3) positioned within a predetermined distance from the sensed gaze location from a plurality of detected marker objects (30-1, 30-2, 30-3, and 30-4). And, the portable device obtains virtual image information on the selected marker objects (30-1 and 30-3) and can display each of virtual images (40-1 and 40-3) based on the positions of the selected marker objects (30-1 and 30-3) using the obtained virtual image information.

FIG. 4 is a diagram of a case that a position change of a marker object is detected according to one embodiment. The position change of the marker can occur due to an absolute position change of the marker object or a relative position change between the portable device and the marker object.

Figure 4A:
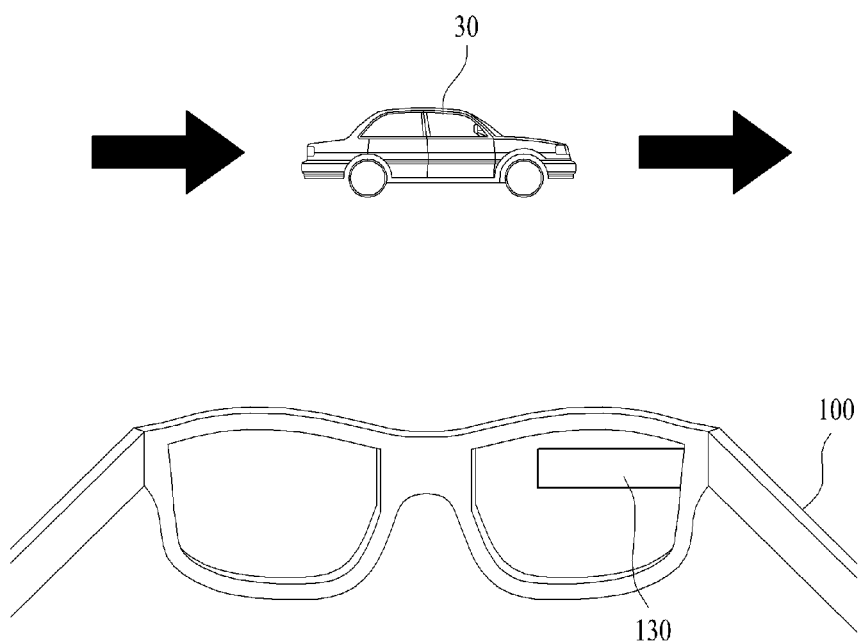
FIGS. 4A-4B are diagrams of a case that a position change of a marker object is detected according to one embodiment.
Figure 4B:
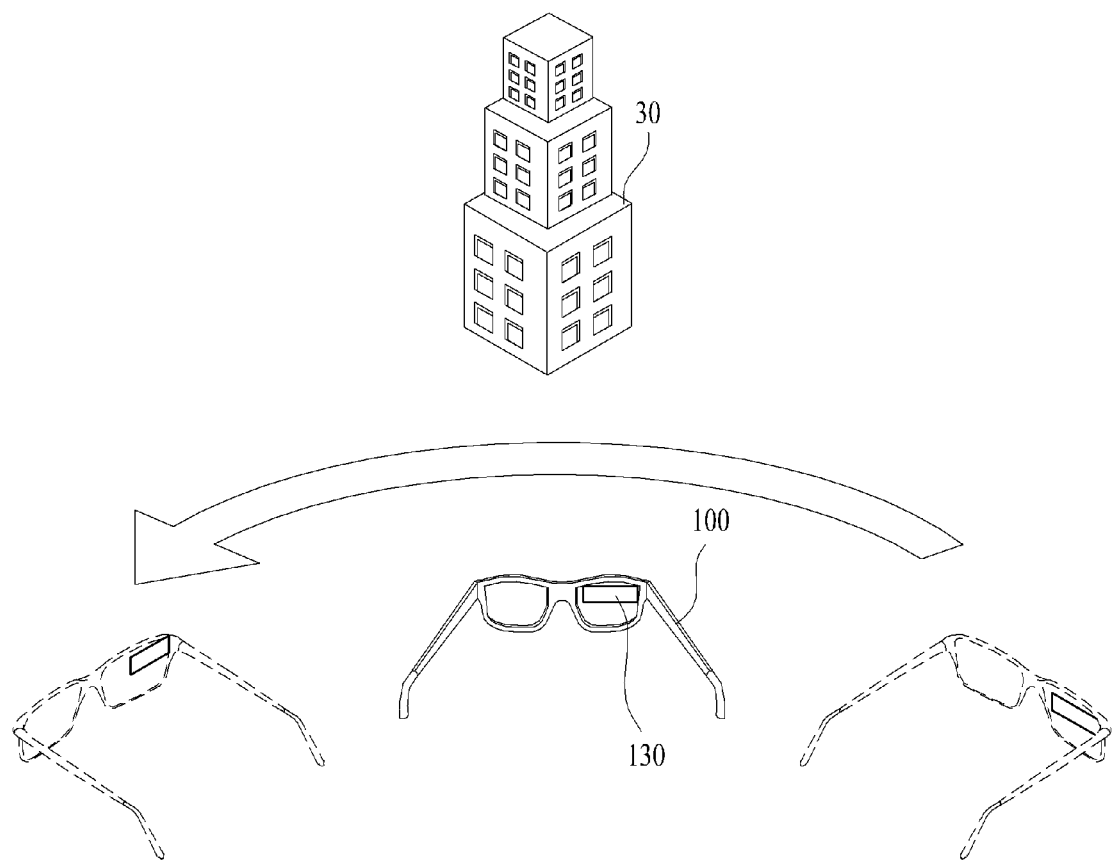

FIG. 4*a* is an embodiment for the absolute position change of the marker object and FIG. 4*b* is an embodiment for the relative position change of the marker object. In this case, the processor can detect the position change of the marker object 30 in a manner of applying a pre-stored detecting algorithm or a tracking algorithm. And, the portable device can sense a position and a direction of the marker object using the sensor unit. The portable device can determine whether the position change corresponds to the absolute position change or the relative position change using a sensed result and can perform a data processing that corresponds to each case.

Referring to FIG. 4*a*, since the marker object 30 is moving and the portable device 100 is at a standstill, the portable device 100 can detect the absolute position change of the marker object 30.

For instance, the portable device 100 can detect the absolute position change of the marker object 30 from an image captured by the camera unit using the processor. As a different example, the portable device 100 can detect the absolute position change of the marker object 30 from a data corresponding to an image displayed in the display unit 130 using the processor. In this case, the marker object 30 may correspond to such a movable object as a bus, a subway, and the like.

Referring to FIG. 4*b*, since the marker object 30 is at a standstill and the portable device 100 is moving, the portable device 100 can detect the relative position change of the marker object 30.

For instance, the portable device 100 can detect the relative position change of the marker object 30 from an image captured by the camera unit using the processor. As a different example, the portable device can detect the relative position change of the marker object 30 from a data corresponding to an image displayed in the display unit 130 using the processor. In this case, the marker object 30 may correspond to such an object fixed on a GPS as a building, a bus stop information board, and the like.

In this case, the portable device 100 can be moved based on a user carrying the device or the user wearing the device. And, the portable device can be moved based on a movement of such a means of transportation as a bus and the like on which the user carrying the device or the user wearing the device is getting.

As mentioned in the foregoing description, when a position change of the marker object 30 is detected, the portable device 100 moves a virtual image 40 according to the position change of the marker object 30 and can obtain a moving speed (also called a first moving speed) of the virtual image 40 using the processor. In this case, the processor can obtain the moving speed of the virtual image 40 from an image displayed in the display unit 130.

And, the processor can further obtain a moving speed (also called a second moving speed) of the marker object 30. In this case, the processor can obtain the moving speed of the marker object 30 from the image captured by the camera unit or the image displayed in the display unit 130. In this case, the processor may obtain the moving speed of the marker object 30 only when the absolute position change of the marker object 30 is detected.

And, when the position change of the marker object is detected, the processor can further obtain acceleration (also called a first moving acceleration) of a virtual image or acceleration of a marker object (also called a second moving acceleration).

FIG. 5 is a diagram of a portable device displaying a virtual image in accordance with a moving speed of the virtual image according to one embodiment. FIG. 5 shows virtual images displayed in the display unit on each time (t1, t2, t3, and t4) and an interval between each of the times (t1, t2, t3, and t4) is identical to each other.

Figure 5A:
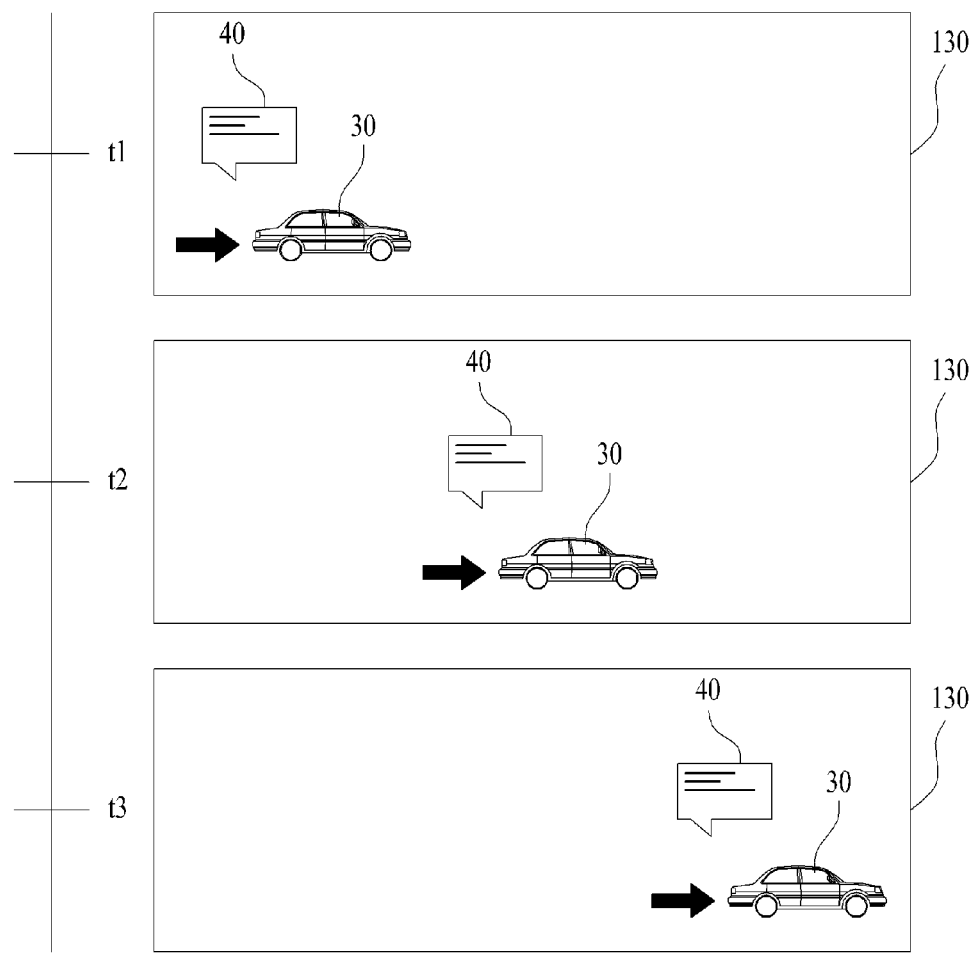

FIG. 5*a* is an embodiment of the portable device displaying a virtual image when a moving speed of the virtual image is slower than a first reference speed, FIG. 5*b* is an embodiment of the portable device displaying a virtual image when a moving speed of the virtual image is faster than the first reference speed and slower than a second reference speed, FIG. 5*c* is an embodiment of the portable device displaying a virtual image when a moving speed of the virtual image is faster than the second reference speed, and FIG. 5*d* is an embodiment of the portable device displaying a virtual image when a moving speed of the virtual image is faster than the first reference speed but acceleration of the virtual image is negative acceleration.

Referring to FIG. 5*a*, the moving speed of the virtual image 40 on each time (t1, t2, and t3) is slower than the first reference speed. In this case, the portable device moves the virtual image 40 according to a position change of a marker object 30. The portable device can continuously display the virtual image 40 in a position adjacent to the marker object 30.

In this case, the first reference speed is a predetermined speed and indicates a minimum speed required to read a moving virtual image. In particular, if the moving speed of the virtual image 40 is slower than the first reference speed, a user can sufficiently read the virtual image 40. Yet, if the moving speed of the virtual image 40 is faster than the first reference speed, the user cannot sufficiently read the virtual image 40.

The first reference speed can be configured based on at least one of a size ratio of a display area and a virtual image, quantity of augmented reality information included in a virtual image, or resolution of a display unit. For instance, the bigger the size of the display area compared to the size of the display unit, the less quantity of the augmented reality information included in the virtual image, and the higher the resolution of the display unit, the greater the first reference speed value increases. The first reference speed can be set to various values according to a user configuration and can be set with various ways.

Referring to FIG. 5b, the moving speed of the virtual image 40 on each time (t1, t2, and t3) is faster than the first reference speed and slower than the second reference speed. In this case, the portable device can lower the moving speed of the virtual image 40 to less than the first reference speed. And, when the moving speed of the virtual image 40 is lowered less than the first reference speed, the portable device changes a graphic user interface format and can display the virtual image in accordance with the changed graphic user interface. Regarding this, it shall be described in detail in FIG. 7.

In this case, the second reference speed is a predetermined speed and indicates a maximum speed required to read a moving virtual image 40. In particular, if the moving speed of the virtual image 40 is faster than the second reference speed, it is impossible or unnecessary for a user to sufficiently read the virtual image 40. Hence, the portable device can stop displaying the virtual image 40. The second reference speed is faster than the first reference speed.

The second reference speed can be configured based on at least one of a size ratio of a display area and a virtual image, quantity of augmented reality information included in a virtual image, or resolution of a display unit. For instance, the bigger the size of the display area compared to the size of the display unit, the less quantity of the augmented reality information included in the virtual image, and the higher the resolution of the display unit, the greater the second reference speed value increases. The second reference speed can be set to various values according to a user configuration and can be set with various ways.

Referring to FIG. 5c, the moving speed of the virtual image 40 on each time (t1, t2, and t3) is faster than the second reference speed. In this case, it is impossible or unnecessary for a user to sufficiently read the virtual image 40. Hence, the portable device can stop displaying the virtual image 40. In this case, the portable device can stop displaying the virtual image in a manner of gradually fading out the virtual image.

FIG. 5a to FIG. 5c depicts a case that the moving speed of the virtual image is a constant speed, by which the present specification may be non-limited. The moving speed of the virtual image 40 can continuously change. Hence, the portable device can obtain the moving speed of the virtual image 40 in real time and can perform the aforementioned data processing according to the moving speed in real time. And, the portable device obtains the moving speed of the virtual image 40 with a predetermined time interval and can perform the aforementioned data processing according to the moving speed with the predetermined time interval.

Although FIG. 5a to FIG. 5c is explained based on the moving speed of the virtual image 40, if the moving speed of the marker object 30 is obtained, an identical explanation can be applied as well. In particular, if the moving speed of the marker object 30 is slower than the first reference speed, the portable device moves the virtual image 40 in accordance with a position change of the marker object 30 and can continuously display the virtual image 40 in a position adjacent to the marker object 30. And, if the moving speed of the marker object 30 is faster than the first reference speed and slower than the second reference speed, the portable device can lower the moving speed of the virtual image 40 less than the first reference speed. And, if the moving speed of the marker object 30 is faster than the second reference speed, the portable device can stop displaying the virtual image 40.

Referring to FIG. 5d, the moving speed of the virtual image 40 on each time (t1 and t2) is faster than the first reference speed, moving acceleration of the virtual image 40 on a time (t2) is negative acceleration, and the moving speed of the virtual image 40 on each time (t3 and t4) is slower than the first reference speed.

If the moving speed of the virtual image 40 is faster than the first reference speed and the moving acceleration of the virtual image 40 is negative acceleration as shown on the time (t2), the portable device determines whether the moving speed of the virtual image is lowered less than the first reference speed based on a magnitude of the acceleration and can display the virtual image 40 according to the determined result. For instance, when the moving acceleration of the virtual image 40 is negative acceleration, which is greater than a predetermined magnitude, since the moving speed of the virtual image will become slower than the first reference speed in a short time although the moving speed of the virtual image 40 on a current timing point is faster than the first reference speed, the portable device may not lower the moving speed of the virtual image 40.

In this case, the predetermined magnitude can be configured based on at least one of a size ratio of a display area and a virtual image, quantity of augmented reality information included in a virtual image, or resolution of a display unit. The predetermined size can be set to various values according to a user configuration and can be set with various ways.

Unlike FIG. 5d, the moving speed of the virtual image 40 and the moving acceleration of the virtual image 40 can continuously change. Hence, the portable device obtains the moving speed of the virtual image 40 and the moving acceleration of the virtual image 40 in real time and can perform the aforementioned data processing according to the moving speed and the moving acceleration in real time. And, the portable device obtains the moving speed of the virtual image 40 and the moving acceleration of the virtual image 40 with a predetermined time interval and can perform the aforementioned data processing according to the moving speed of the virtual image 40 and the moving acceleration of the virtual image 40 with the predetermined time interval.

Although FIG. 5d is explained based on the moving speed of the virtual image 40 and the moving acceleration of the virtual image 40, if the moving speed of the marker object 30 and the moving acceleration of the marker object 30 are obtained, an identical explanation can be applied as well. In particular, if the moving speed of the marker object 30 is faster than the first reference speed and the moving acceleration of the marker object 30 is negative acceleration, the portable device determines whether the moving speed of the virtual image 30 is lowered less than the first reference speed based on a magnitude of the acceleration and can display the virtual image 40 according to the determined result. For instance, if the moving acceleration of the marker object 30 has negative acceleration, which is greater than a predetermined magnitude, since the moving speed of the virtual image will become slower than the first reference speed in a short time although the moving speed of the virtual image 40 on a current timing point is faster than the first reference speed, the portable device may not lower the moving speed of the virtual image 40.

FIG. 6 is a diagram of a portable device displaying a virtual image in accordance with duration of which the marker object is detected or a size of which the marker object is detected according to one embodiment. FIG. 6 shows a virtual image displayed in the display unit on each time (t1, t2, and t3) and an interval between each of the times is identical to each other.

Figure 6A:
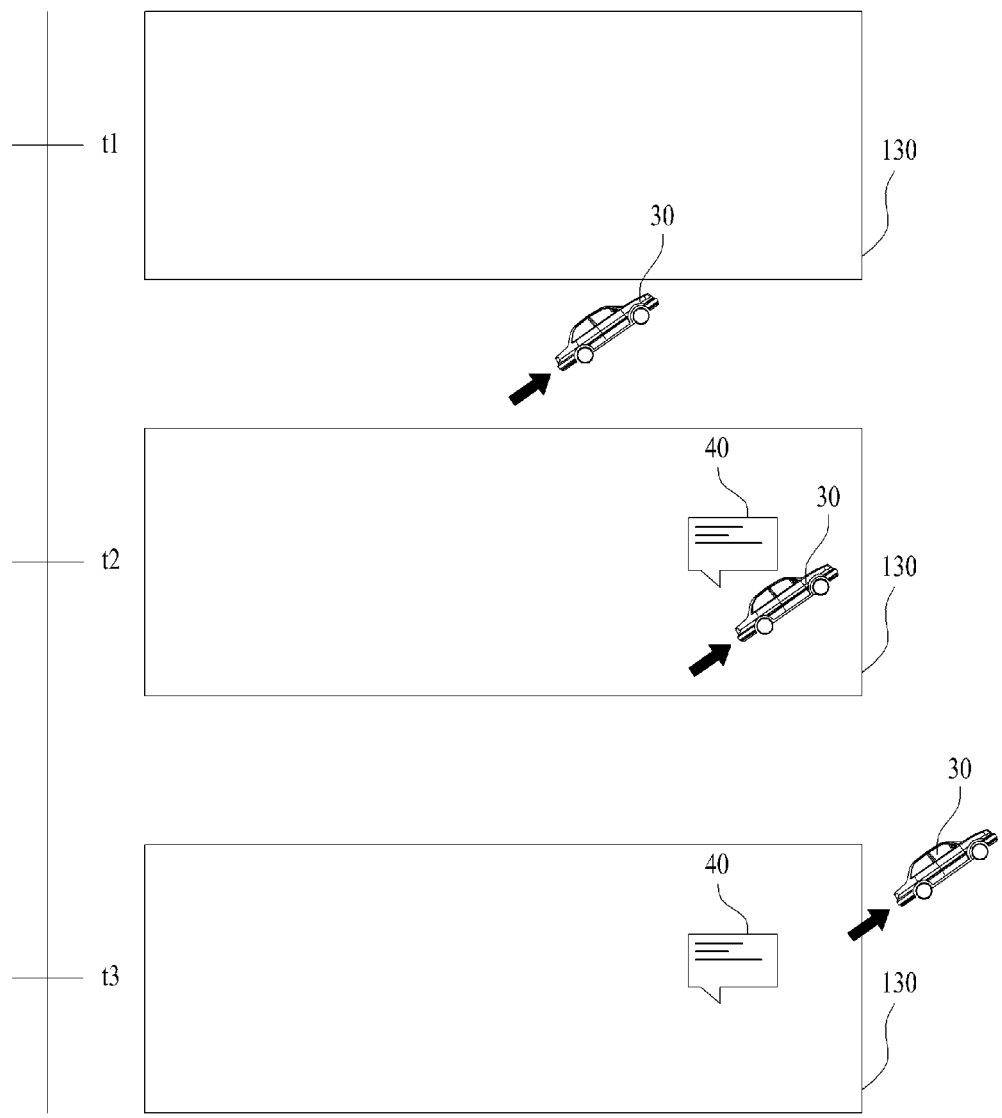
FIGS. 6A-6B are diagrams of a portable device displaying a virtual image in accordance with duration of which the marker object is detected or a size of which the marker object is detected according to one embodiment.
Figure 6B:
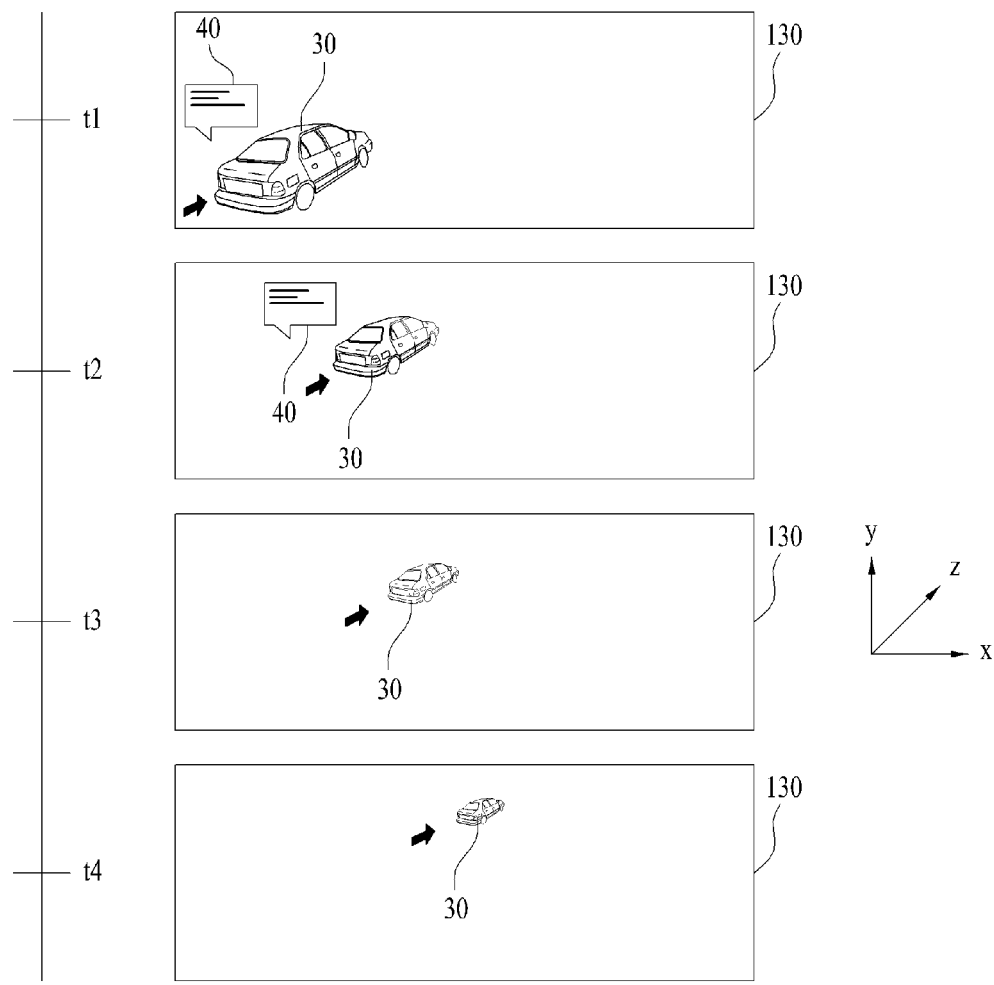

FIG. 6a is an embodiment of the portable device displaying a virtual image when the marker object is no longer detected and the duration is shorter than predetermined duration and FIG. 6b is an embodiment of the portable device displaying a virtual image when the size is smaller than a predetermined size.

Referring to FIG. 6a, although the moving speed of the virtual image 40 or the moving speed of the marker object 30 on each time (t1, t2, and t3) is slower than the first reference speed, the marker object is no longer detected and the duration is shorter than predetermined duration. In this case, the portable device can further display the virtual image 40 for a predetermined period after the marker object is no longer detected. In this case, the predetermined period can be set to various values according to a user configuration and can be set with various ways.

According to one embodiment, the portable device can display the virtual image 40 as a static state in a position where the detecting of the marker object 30 is ended for a predetermined period after a time (t2) on which the detecting of the marker object 30 is ended as shown on time (t3). According to a different embodiment, the portable device changes a graphic user interface and can display the virtual image 40 in accordance with the changed graphic user interface. Regarding this, it shall be described in detail in FIG. 7.

In this case, the predetermined duration indicates a minimum duration required to sufficiently read a moving virtual image. In particular, although the moving speed of the virtual image 40 is slower than the first reference speed, if the duration is shorter than the predetermined duration, a user cannot sufficiently read the virtual image.

The predetermined duration can be configured based on at least one of a size ratio of an angle of view area and a marker object, quantity of augmented reality information included in a virtual image, or resolution of a display unit. For instance, the bigger the size of the angle of view area compared to the size of the display unit, the less quantity of the augmented reality information included in the virtual image, and the higher the resolution of the display unit, the greater the predetermined duration value increases. The predetermined duration can be set to various values according to a user configuration and can be set with various ways.

Referring to FIG. 6b, although the moving speed of the virtual image 40 or the moving speed of the marker image 30 is slower than the first reference speed on each time (t1, t2, t3, and t4), the size of the marker object 30 is smaller than the predetermined size. In this case, the portable device can stop displaying the virtual image 40.

In this case, the predetermined size indicates a minimum size required to display a virtual image. In particular, although the moving speed of the virtual image 40 is slower than the first reference speed, if the size of the marker object 30 is smaller than the predetermined size, it may correspond to a case that the marker object 30 is apart from a vision of a user as far as not necessary to display the virtual image 40 for the detected marker object 30.

The predetermined size can be configured based on at least one of an angle of view area and a marker object, quantity of augmented reality information included in a virtual image, or resolution of a display unit. For instance, the bigger the size of the angle of view area compared to the size of the display unit, the less quantity of the augmented reality information included in the virtual image, and the higher the resolution of the display unit, the greater the predetermined size value increases. The predetermined size can be set to various values according to a user configuration and can be set with various ways.

Although it is assumed that the moving speed of the virtual image 40 or the moving speed of the marker object 30 is slower than the first reference speed in FIG. 6a and FIG. 6b, in case that the moving speed of the virtual image 40 is faster than the first reference speed, an identical explanation can be applied as well.

FIG. 7 is a diagram of a portable device displaying a virtual image with a changed displaying method in case of lowering a moving speed of the virtual image according to one embodiment.

Figure 7A:
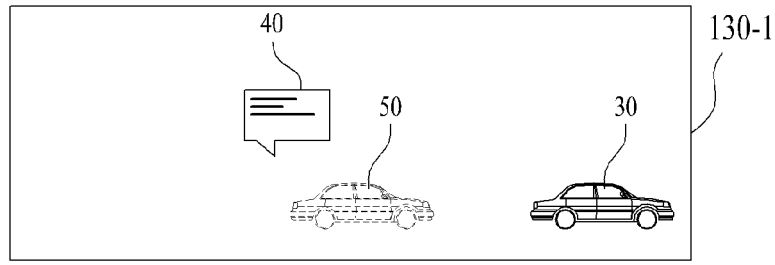
FIGS. 7A-7D are diagrams of a portable device displaying a virtual image with a changed displaying method in case of lowering a moving speed of the virtual image according to one embodiment.

Referring to FIG. 7a, when the moving speed of the virtual image 40 is lowered less than the first reference speed, the portable device obtains a virtual marker object 50 corresponding to the marker object 30 using the processor. The portable device can display the obtained virtual marker object 50 in the display unit 130-1 together with the virtual image 40.

In this case, the portable device can obtain the virtual marker object 50 from an internal storage unit or an external storage unit. In this case, the virtual marker object 50 means a virtual object corresponding to the marker object 30. In this case, a shape, a color, transparency, a position, and the like of the virtual marker object can be variously set according to such various methods as a user input, a pre-stored method, and the like.

As mentioned in the foregoing description, when the portable device displays the virtual marker object 50 together with the virtual image 40, although the marker object 30 deviates from a vision of a user, the portable device can inform the user of the marker object 30 corresponding to the virtual image 40.

And, the portable device can further display an indicator indicating a connection between the virtual marker object and the corresponding marker object.

Figure 7B:
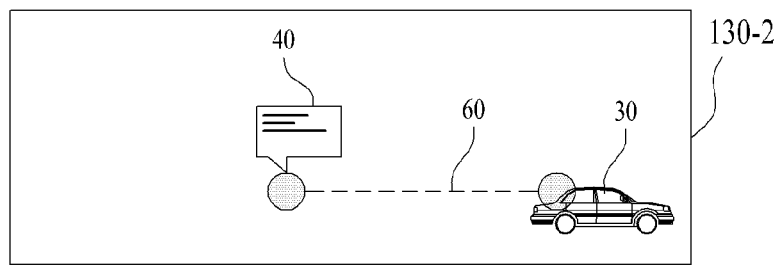

Referring to FIG. 7b, when the moving speed of the virtual image 40 is lowered less than the first reference speed, the portable device can further display the indicator 60 indicating the connection between the virtual image 40 and the corresponding marker object 30 in the display unit 130-2 using the processor. In this case, a shape, a color, a position, and the like of the indicator can be variously set according to such various methods as a user input, a pre-stored method, and the like.

As mentioned earlier, in case that the portable device further displays the indicator 60, although a position of the marker object 30 is far away from a position of the virtual image 40, the portable device can inform a user of the marker object 30 corresponding to the virtual image 40.

Figure 7C:
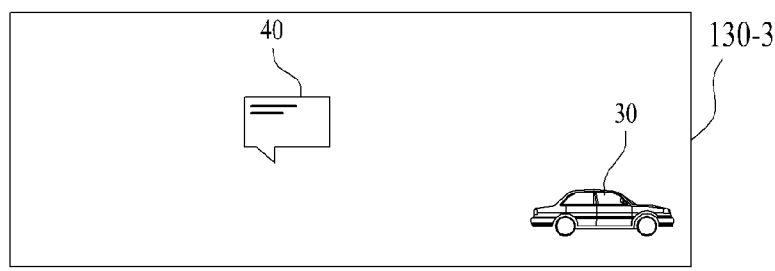

Referring to FIG. 7c, when the moving speed of the virtual image 40 is lowered less than the first reference speed, the portable device can display the virtual image 40 in a simple display mode in the display unit 130-3 using the processor. In this case, as mentioned earlier, the simple display mode is a display mode configured to include a part of selected augmented reality information in a display object only among the augmented reality informations related to the marker object included in the virtual image.

In this case, the processor can select a part of the augmented reality information only among the augmented reality informations according to a predefined priority. For instance, if the augmented reality information includes a bus line, a position of a next bus, information on an allocation interval and a priority is determined in an order of the bus line, the position of the next bus, and the allocation interval, the processor can display the augmented reality information in a manner of selecting only the augmented reality information on the bus line having a first priority and on the position of the next bus having a second priority. In this case, the priority can be variously set according to such various methods as a user input, a predetermined method, and the like.

As mentioned earlier, in case that the portable device displays a virtual image including less quantity of augmented reality information, although a moving speed of the virtual image is fast, the portable device can enhance the readability of a user for the virtual image.

Figure 7D:
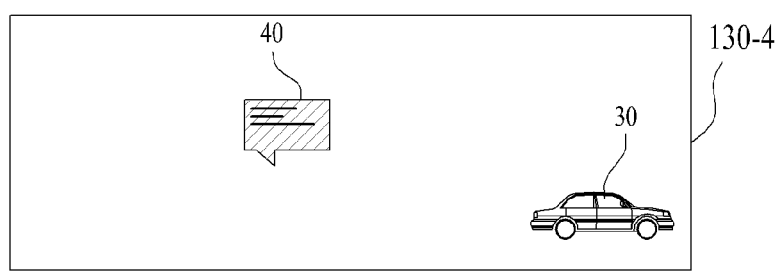

Referring to FIG. 7d, when the moving speed is lowered less than the first reference speed, the processor changes a graphic user interface format and can display a virtual image 40 in the display unit 130-4 in accordance with the changed graphic user interface format. Although FIG. 7d depicts the virtual image 40 displaying the virtual image 40 in a manner of changing its graphic user interface format for a displayed color of the virtual image, as mentioned earlier, the graphic user interface format can include a display position, a display size, a display color, or a configuration value for transparency of the virtual image 40. In this case, the graphic user interface format can be variously set according to such various methods as a user input, a pre-stored method, and the like.

In case that the portable device displays a virtual image by such a scheme of reducing a size of the virtual image and the like in a manner of changing the graphic user interface format, although a moving speed of the virtual image is fast, the portable device can enhance the readability of a user for the virtual image.

Although FIG. 7 depicts embodiments for a case of lowering the moving speed of the virtual image, by which the present specification may be non-limited. In case that the virtual image is displayed as a static state, the identical embodiment can be applied as well.

Figure 8:
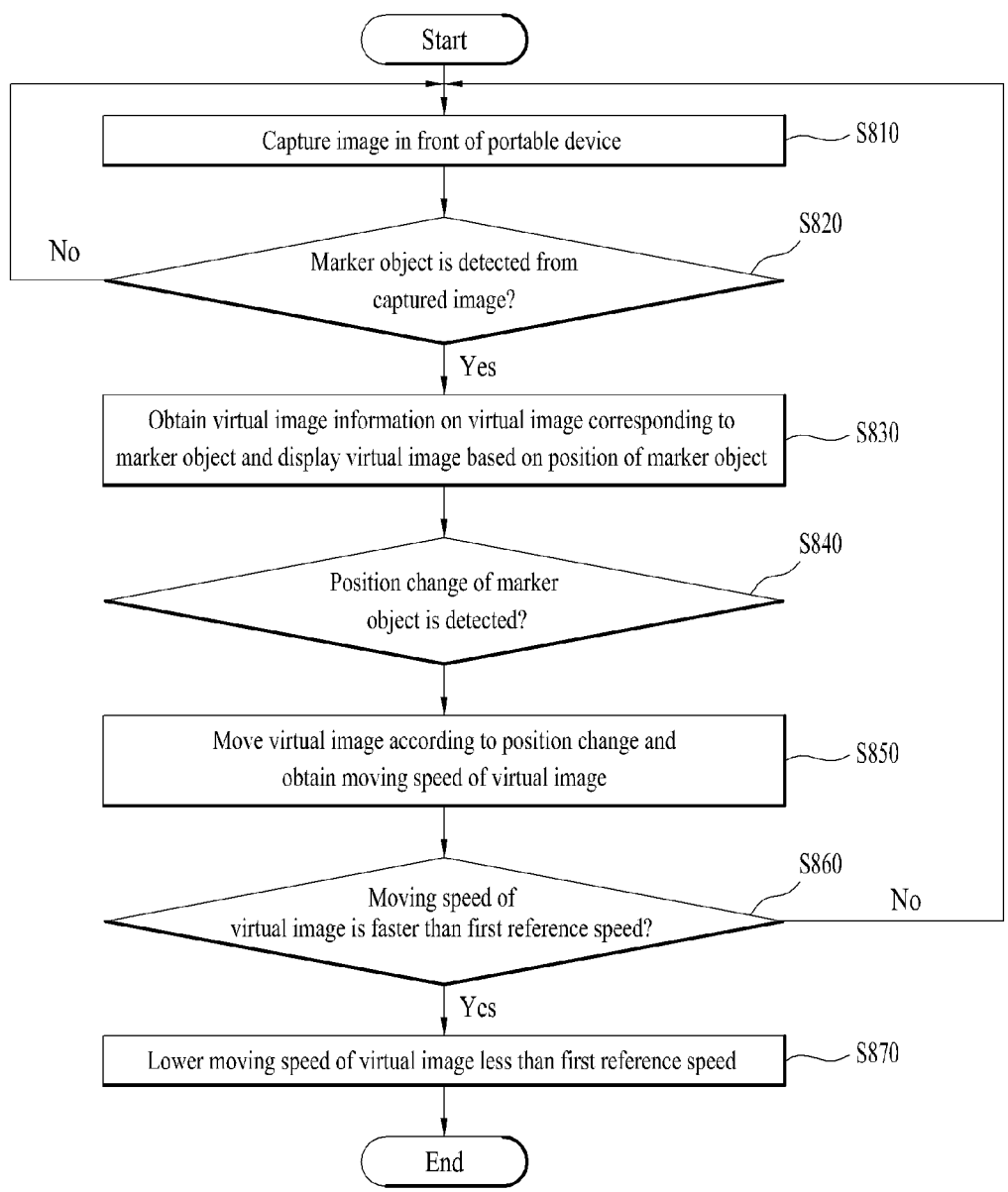
FIG. 8 is a flowchart of a method of controlling a portable device according to one embodiment.

FIG. 8 is a flowchart of a method of controlling a portable device according to one embodiment.

First of all, the portable device can capture an image in front of a device [S810]. As mentioned earlier in FIG. 2, the portable device captures the image in front of the device within an angle of view via a camera unit and can deliver the captured image to a processor. In this case, the camera unit can capture the image in front of the device contiguously or with a specific time interval.

And, the portable device can detect a marker object from the captured image [S820].

As mentioned earlier in FIG. 2, the portable device can detect the marker object from the image captured by the camera unit. And, the portable device can detect the marker object from a data corresponding to the image displayed in a display unit.

And, in case that the marker object is detected, the portable device obtains a virtual image information on a virtual image related to the marker object and can display the virtual image based on a position of the marker object [S830].

As mentioned earlier in FIG. 2, the portable device can obtain the virtual image information from an internal storage unit or an external storage unit. In this case, the virtual image information can include at least one of augmented reality information related to the marker object, information on a display mode, or information on a graphic user interface format. Detailed contents are described in the foregoing description. As mentioned earlier in FIG. 3, the portable device obtains a virtual image for a selected marker object or a specific marker object positioned at a gaze location of a user and can display the virtual image corresponding to the specific marker object only.

And, the portable device can detect a position change of the marker object from the captured image [S840]. As mentioned earlier in FIG. 4, the portable device can detect an absolute position change of the marker object or a relative position change between the device and the marker object from the image captured by the camera unit or the data corresponding to the image displayed in the display unit. And, the portable device senses a position and a direction of the marker object using a sensor unit. The portable device can judge in a manner of distinguishing the absolute position change of the marker object from the relative position change of the marker object using a sensed result and can perform a data processing corresponding to each case.

And, when the position change of the marker object is detected, the portable device moves the virtual image according to the position change and can obtain a moving speed of the virtual image [S850].

As mentioned earlier in FIG. 5, the portable device moves the virtual image according to the position change of the marker object and can continuously display the virtual image in a position adjacent to the marker object. And, the portable device can further obtain the moving speed of the marker object. Moreover, the portable device can further obtain acceleration of the virtual image and acceleration of the marker object.

And, the portable device 100 determine whether the moving speed of the virtual image is faster than a first reference speed [S860].

As mentioned earlier in FIG. 5, the portable device can determine whether the moving speed of the virtual image is faster than a second reference speed. And, the portable device can determine whether the moving speed of the marker object is faster than the first reference speed or the second reference speed. In this case, the first reference speed is a predetermined speed. The first reference speed indicates a minimum speed required to read a moving virtual image. The second reference speed is a predetermined speed. The second reference speed indicates a maximum speed required to read a moving virtual image 40. The second reference speed is faster than the first reference speed. Detailed contents are described in the foregoing description.

And, when the moving speed of the virtual image is faster than the first reference speed, the portable device 100 can lower the moving speed of the virtual image less than the first reference speed.

Regarding this, it is identical to the contents described in FIG. 6. As mentioned earlier in FIG. 7, when the moving speed of the virtual image is lowered, the portable device can further display a virtual marker object or an indicator. And, when moving speed of the virtual image is lowered, the portable device can change the display mode or the graphic user interface format and display the virtual image in accordance with the changed display mode or the changed graphic user interface format. By using the aforementioned display method, readability of a user for the virtual image can be enhanced.

Figure 9:
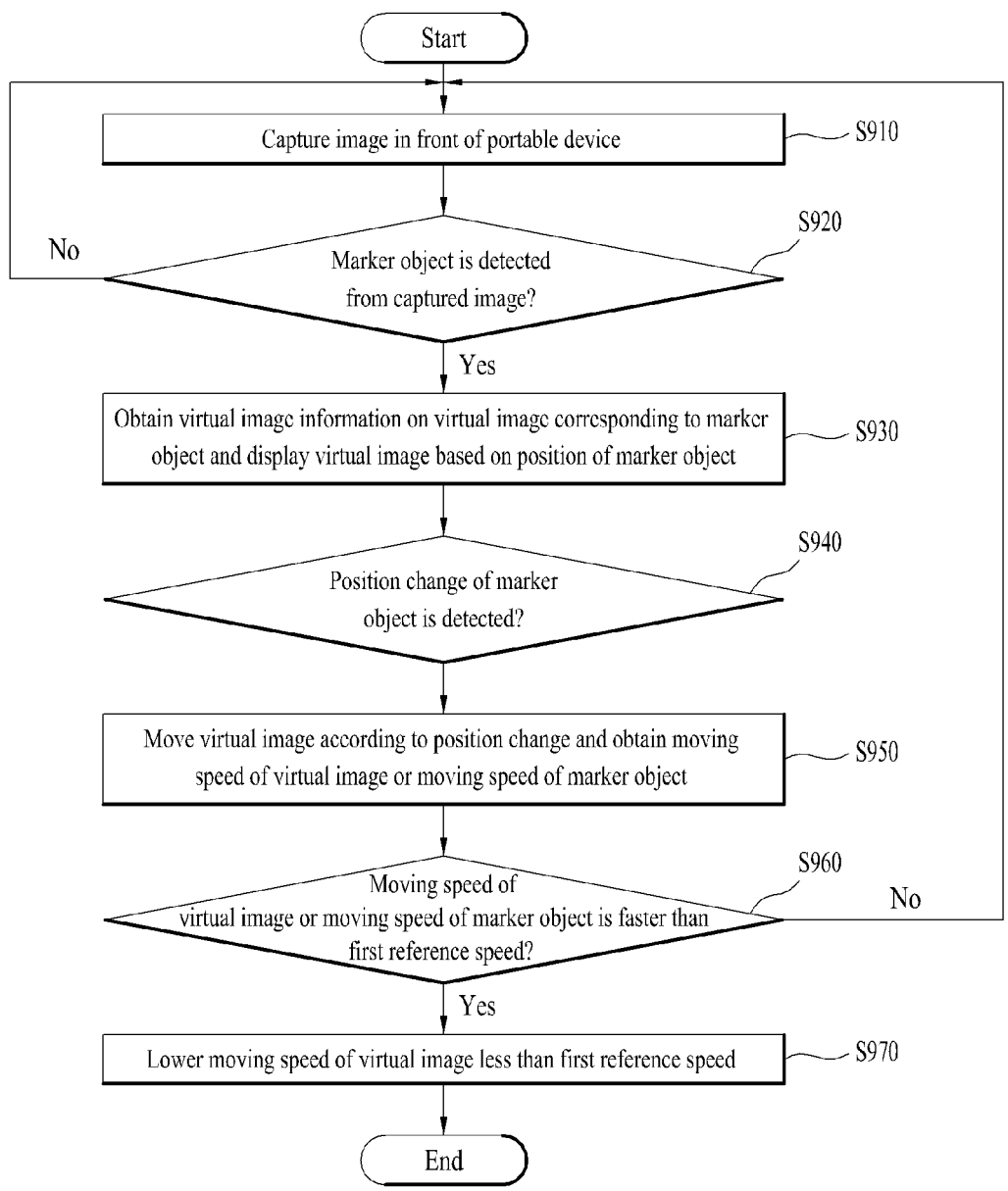
FIG. 9 is a flowchart of a method of controlling a portable device according to a different embodiment.

FIG. 9 is a flowchart of a method of controlling a portable device according to a different embodiment.

First of all, the portable device can capture an image in front of a device [S910]. And, the portable device can detect a marker object from the captured image [S920]. And, in case that the marker object is detected, the portable device obtains virtual image information on a virtual image related to the marker object and can display the virtual image based on a position of the marker object [S930]. And, the portable device can detect a position change of the marker object from the captured image [S940]. Explanation on S910 to S940 is omitted since it is identical to the contents of S810 to S840 mentioned earlier in FIG. 8.

And, when the position change of the marker object is detected, the portable device moves the virtual image according to the position change and can obtain a moving speed of the virtual image or a moving speed of the marker object [S950]. In particular, as mentioned earlier in FIG. 5, the portable device moves the virtual image according to the position change of the marker object and can continuously display the virtual image in a position adjacent to the marker object. And, the portable device can obtain the moving speed of the virtual image or the moving speed of the marker object. Moreover, the portable device can further obtain acceleration of the virtual image or acceleration of the marker object.

And, the portable device 100 can determine whether the moving speed of the virtual image or the moving speed of the marker object is faster than a first reference speed [S960]. Moreover, as mentioned earlier in FIG. 5, the portable device can determine whether the moving speed of the virtual image or the moving speed of the marker object is faster than a second reference speed. In this case, the first reference speed is a predetermined speed. The first reference speed indicates a minimum speed required to read a moving virtual image. The second reference speed is a predetermined speed. The second reference speed indicates a maximum speed required to read a moving virtual image 40. Detailed contents are described in the foregoing description.

And, when the moving speed of the virtual image or the moving speed of the marker object is faster than the first reference speed, the portable device can lower the moving speed of the virtual image less than the first reference speed [S970]. Regarding this, it is identical to the contents described in FIG. 8.

Moreover, for clarity of explanation, each diagram is explained in a manner of being divided. Yet, it is possible to design a new embodiment to implement the new embodiment by combining the embodiments, which are described in each of the diagrams. And, according to the necessity of those skilled in the art, designing a recording media readable by the computer, which has recorded a program for executing the previously explained embodiments, also belongs to a scope of a right.

A portable device according to the present specification and a controlling method therefor may not limitedly apply to the composition and method of the aforementioned embodiments. The aforementioned embodiments may be configured in a manner of being selectively combined the whole of the embodiments or a part of the embodiments to achieve various modifications.

Meanwhile, a portable device according to the present specification and a method of controlling therefor can be implemented with a code readable by a processor in a recording media readable by the processor installed in a network device. The recording media readable by the processor may include all kinds of recording devices for storing data capable of being read by the processor. The examples of the recording media readable by the processor may include a ROM, a RAM, a magnetic tape, a floppy disc, an optical data storing device and the like. And, implementing in a form of a carrier wave such as a transmission via the internet and the like is also included. The recording media readable by the processor are distributed to the computer systems connected by a network and codes readable by the processor can be stored and executed in a manner of being distributed.

While the present specification has been described and illustrated herein with reference to the preferred embodiments and diagrams thereof, the present specification may be non-limited to the aforementioned embodiments and it will be apparent to those skilled in the art that various modifications and variations can be made therein without departing from the spirit and scope of the present specification. Thus, it is intended that the present specification covers the modifications and variations of this invention that come within the scope of the appended claims and their equivalents.

And, both an apparatus invention and a method invention are explained in the present specification and the explanation on the both of the inventions can be complementally applied, if necessary.

What is claimed is:

1. A portable device, comprising:
   a camera unit configured to capture an image in front of the portable device;
   a display unit configured to display a virtual image; and
   a processor configured to control the camera unit and the display unit,
   the processor further configured to:
   detect a marker object from the image,
   display the virtual image corresponding to the marker object based on a position of the marker object when the marker object is detected,
   detect a position change of the marker object,
   move the virtual image according to the position change when the position change is detected,
   obtain a first moving speed of the virtual image or a second moving speed of the marker object, and
   when the first moving speed or the second moving speed is faster than a first reference speed, lower the first moving speed to less than the first reference speed.

2. The portable device of claim 1, wherein the processor is further configured to stop displaying the virtual image when the first moving speed or the second moving speed is faster than a second reference speed,
   wherein the second reference speed is faster than the first reference speed.

3. The portable device of claim 1, wherein the processor is further configured to display a virtual object corresponding to the marker object together with the virtual image when the first moving speed is lowered and less than the first reference speed.

4. The portable device of claim 1, wherein the processor is further configured to additionally display an indicator indicating a connection between the virtual image and the marker object when the first moving speed is lowered and less than the first reference speed.

5. The portable device of claim 1, wherein the information on the virtual image comprises at least one of augmented reality information related to the marker object, display mode information, and graphic user interface format information.

6. The portable device of claim 1, wherein the processor is further configured to display the virtual image with a simple display mode when the first moving speed is lowered and less than the first reference speed.

7. The portable device of claim 6, wherein the simple display mode corresponds to a display mode only displaying selected augmented reality information of augmented reality information contained in the virtual image.

8. The portable device of claim 1, wherein the processor is further configured to:
   obtain information on duration of which the marker object is detected when the position change is detected, and
   display the virtual image for a predetermined period when the marker object is no longer detected and the duration is shorter than predetermined duration.

9. The portable device of claim 8, wherein the processor is further configured to display the virtual image as a stationary state in a position where the marker object is lastly detected.

10. The portable device of claim 1, wherein the processor is further configured to:
obtain information on a size of which the marker object is detected when the position change is detected, and
stop displaying the virtual image when the size is smaller than a predetermined size.

11. The portable device of claim 1, further comprising a sensor unit configured to sense a user gaze and deliver a sensed result to the processor,
Wherein the processor is further configured to:
detect a gaze location where the user's gaze is on when a plurality of marker objects is detected, and
select at least one marker object from the plurality of marker objects based on the gaze location.

12. The portable device of claim 11, wherein the processor is further configured to select at least one marker object, which is positioned within a predetermined distance from the gaze location.

13. The portable device of claim 1, wherein the processor is further configured to:
change a graphic user interface format when the first moving speed is lowered and less than the first reference speed, and
display the virtual image according to the changed graphic user interface format.

14. The portable device of claim 13, wherein the graphic user interface format comprises at least one of a display position, a display size, a display shape, a display color, or a display transparency of the virtual image.

15. The portable device of claim 1, wherein the portable device comprises a head mounted display (HMD).

16. The portable device of claim 15, wherein the display unit consists of an optical see-through display panel.

17. The portable device of claim 1, wherein when the first moving speed or the second moving speed is faster than the first reference speed, the processor is further configured to
obtain acceleration of the virtual image or acceleration of the marker object, and
determine whether the first moving speed is lowered and less than the first reference speed based on the obtained acceleration.

18. The portable device of claim 17, wherein the processor is further configured not to lower the first moving speed less than the first reference speed when the obtained acceleration is negative acceleration, which is greater than a predetermined magnitude.

19. A method of controlling a portable device, comprising the steps of:
capturing an image in front of the portable device;
detecting a marker object from the image;
when the marker object is detected, obtaining an information on the virtual image corresponding to the marker object and displaying the virtual image based on a position of the marker object;
detecting a position change of the marker object;
when the position change is detected, moving the virtual image according to the position change and obtaining a moving speed of the virtual image or a moving speed of the marker object; and
when the moving speed of the virtual image or the moving speed of the marker object is faster than a first reference speed, lowering the moving speed of the virtual image to less than the first reference speed.

20. The method of claim 19, when the moving speed of the virtual image or the moving speed of the marker object is faster than a second reference speed, further comprising the step of stopping displaying the virtual image,
wherein the second reference speed is faster than the first reference speed.

* * * * *